S. HOUGH.
ADJUSTABLE AND IMPROVED CUTTING HEAD FOR BORING OUT SHELLS.
APPLICATION FILED AUG. 24, 1916.

1,251,527.

Patented Jan. 1, 1918.
2 SHEETS—SHEET 1.

INVENTOR
Samuel Hough
W. W. Williamson
Atty.

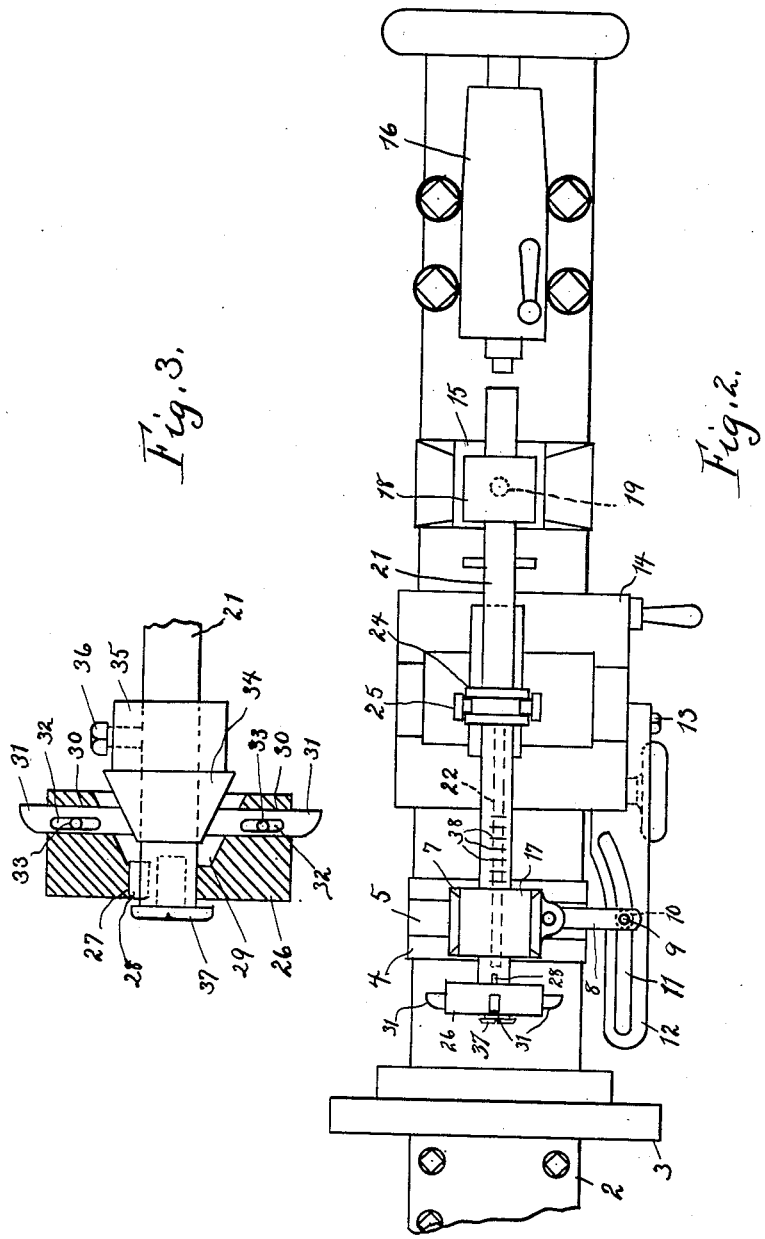

UNITED STATES PATENT OFFICE.

SAMUEL HOUGH, OF ATCO, NEW JERSEY, ASSIGNOR OF ONE-HALF TO THOMAS A. SCHMITT, OF PHILADELPHIA, PENNSYLVANIA.

ADJUSTABLE AND IMPROVED CUTTING-HEAD FOR BORING OUT SHELLS.

1,251,527.     Specification of Letters Patent.     Patented Jan. 1, 1918.

Application filed August 24, 1916. Serial No. 116,715.

*To all whom it may concern:*

Be it known that I, SAMUEL HOUGH, a citizen of the United States, residing at Atco, in the county of Camden and State of New Jersey, have invented new and useful Improvements in Adjustable and Improved Cutting-Heads for Boring Out Shells, of which the following is a specification.

My invention relates to new and useful improvements in adjustable and improved cutting heads for boring out shells, and has for its object to provide an exceedingly simple and effective device of this character, whereby the tool is held absolutely central and rigid at all times, so that the work will always be the same and very accurate.

Another object of the invention is to mount a spindle for carrying the tool in two supports, which will maintain said spindle in a horizontal position.

A further object of the invention is to construct one of the supports so that the spindle may be swung transversely on its horizontal line and to provide a taper attachment for the tool rest for so swinging the spindle to produce different tapers in the work.

A still further object of the invention is to mount a laterally movable tool carrying spindle in two supports and provide means on the carriage for engaging the spindle to slide the same in the supports.

Still another object of the invention is to provide a taper attachment of peculiar and unique construction for automatically moving the tool carrying spindle transversely any desired distance to produce the desired taper in the work.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this specification, in which—

Fig. 2, is a plan view thereof; and

Fig. 3 is a sectional view of the tool head.

Figure 1:
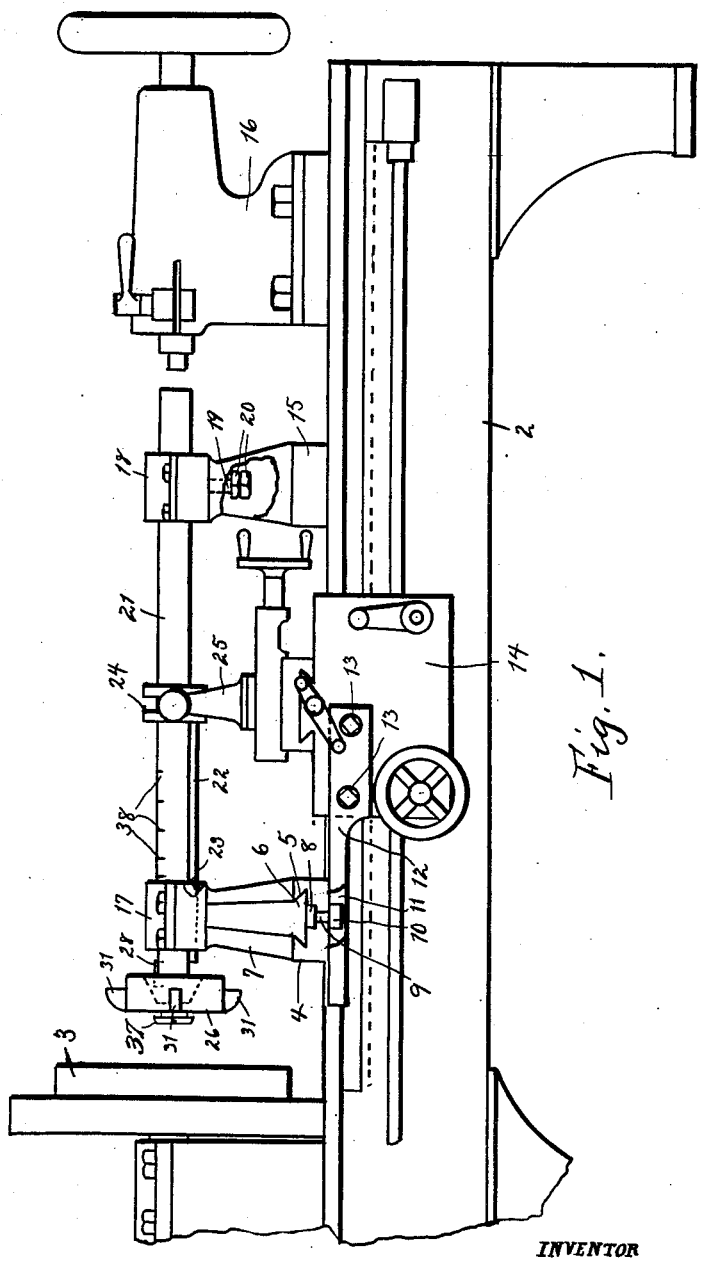
Figure 1, is a fragmentary side elevation of a lathe showing my invention applied thereto, portions of which are broken away to clearly illustrate the construction.

In carrying out my invention as here embodied 2 represents a lathe of any desirable construction and size and provided with any of the well known and ordinary equivalents or attachments at any suitable point. Adjacent the chuck 3 or head of the lathe is mounted a support block 4 bolted or otherwise securely fastened to the bed of the lathe and this support block has a transverse undercut groove 5 formed therein, in which is slidably mounted the dove-tailed foot 6 of the support 7, the latter carrying a journal box 17. To the sliding support is rigidly secured in any suitable manner a connecting bar or lever 8, the outer end of which carries a depending pin or trunnion 9 on which is journaled a roller 10. The roller 10 is located in a guide slot 11 of the taper attachment or member 12, said taper attachment being secured in any suitable manner as by bolts 13 to the apron 14, so that said taper attachment is movable with said carriage. Another support 15 is secured to the bed of the lathe near the opposite end or adjacent the tail bearing 16.

To the support 15 is swiveled the journal box 18 by means of a shank 19 passing through the top portion of the support and having threaded on the inner end suitable retaining means 20 such as nuts, one being used to lock the other as will be obvious. In the journal boxes of the supports is slidably mounted the tool carrying spindle 21 adapted to move laterally of the lathe, and is splined or keyed in the head support 7 as by a key 22 carried by the spindle registering with a key-way 23 in the head support 7, said key preferably being situated on the underside of the spindle.

Intermediate the ends of the spindle is arranged a yoke 24 which is engaged by a fork 25 carried by the carriage to move the spindle 21 laterally of the lathe in unison with the carriage, said carriage being power or hand driven in any well known manner. On the end of the spindle 21 adjacent the chuck is mounted the tool head adapted for the particular work which is being done, said tool head adapted to carry a plurality of tools, such as cutters, and although tools of different constructions may be used, I have shown one which is particularly adapted for boring and finishing shells. This tool head consists of a ring or body 26 having a key-way 27 therein for registration with a key 28 carried by the outer end of the tool spindle, and has a conical shaped chamber 29 with which communicates a plurality of tool receiving openings 30 radiating therefrom and open at their outer ends. In these tool receiving openings are mounted the tools 31, such as cutting tools having slots 32 therein, through which pass suitable retaining means such as bolts 33, said bolts limiting the movements of the tools and also preventing their accidental displacement.

The tools when in place have their cutting edges projecting outside of the ring or body 26 with their inner ends projecting into the conical chamber 29, and these inner ends are engaged by the conical nose or end 34 of the adjusting sleeve 35, said adjusting sleeve being slidably mounted upon the tool spindle to the rear of the body 26, and is held in its different adjusted positions by means of a set screw 36 or its equivalent. The entire tool head when mounted upon the spindle is held in place in the ordinary manner by a fastening bolt 37.

In practice when the tools 31 are to be adjusted, the set screw 36 is backed off, so that the adjusting sleeve 35 is loose upon the spindle, at which time said adjusting sleeve is moved backward or forward the desired distance to throw the tools in or out, and when the desired adjustment is obtained, the set screw is again screwed home, which will positively prevent the tools 31 from being accidentally displaced or their adjustment changed.

When the device is being used for boring and finishing the taper attachment is adjusted so that the head support 7 will be moved transversely, at the proper time, and when this has been done, the work is placed in the chuck and the carriage is thrown in so as to begin its lateral movement, and as the carriage moves along, the tool holding spindle will be carried thereby, through the medium of the fork 25 and the yoke 24, which will move the spindle up as fast as the tool can do its work. When the straight boring has reached a certain depth, the movement of the carriage will cause the angular portion of the slot in the taper attachment to engage the roller 10, and thus move the head support 7 to one side the desired distance for the degree of taper, thus carrying the tool spindle transversely on its original line. This movement of the tool spindle is permitted because of the swivel connection of the journal boxes or bearing 18 with the tail support 15.

The tool spindle 21 may also have suitable designation marks 38 thereon to indicate to the operator the distance or length of the boring.

From the foregoing it will be obvious that I have produced an attachment for lathes for boring and finishing in which a plurality of tools may be utilized, so that the work may be done more quickly, and the construction is such that the tool spindle will be rigidly held to prevent chattering of the tool, thereby accomplishing more accurate work, than is possible with lathe constructions of the present day, and since there can be no chattering of the tool, all pieces of work will be identical, and it is unnecessary to caliper each and every piece or different parts of any one piece.

When my improved tool head is used in conjunction with the other parts of my invention, the tools may be readily and quickly adjusted to different sizes or to the original size as the cutting edge wears away, thus making it necessary only to caliper the tool, and as this is outside work, it is a relatively easy matter.

Of course I do not wish to be limited to the exact details of construction as here shown, as these may be varied within the limits of the appended claims without departing from the spirit of my invention.

Having thus fully described my invention, what I claim as new and useful, is—

1. In combination a lathe provided with a carriage, a block having an undercut slot therein secured to the lathe bed adjacent the head thereof, a support carrying a journal box or bearing, the latter having a key-way therein, a dove-tailed foot carried by the support and mounted in the undercut slot, whereby said slot may be moved transversely, another support secured to the lathe bed adjacent the tail end thereof, a journal box or bearing swiveled to said support, a tool spindle slidably mounted in the journal boxes and arranged to move laterally of the lathe, a longitudinal key carried by the spindle and registering with the key-way in the journal box of the support at the head of the lathe, and means carried by the carriage and engaging the spindle for moving said spindle laterally in unison with the carriage.

2. In combination a lathe provided with a carriage, a block having an undercut slot therein secured to the lathe bed adjacent the head thereof, a support carrying a journal box or bearing, the latter having a key-way therein, a dove-tailed foot carried by the support and mounted in the undercut slot, whereby said slot may be moved transversely, another support secured to the lathe bed adjacent the tail end thereof, a journal box or bearing swiveled to said support, a tool spindle slidably mounted in the journal boxes and arranged to move laterally of the lathe, a longitudinal key carried by the spindle and registering with the key-way in the journal box of the support at the head of the lathe, a yoke carried by the spindle intermediate its ends, and a fork carried by the carriage and engaging said yoke for moving the spindle laterally with the carriage.

3. In combination a lathe provided with a carriage, a block having an undercut slot therein secured to the lathe bed adjacent the head thereof, a support carrying a journal box or bearing, the latter having a key-way therein, a dove-tailed foot carried by the support and mounted in the undercut slot, whereby said slot may be moved transversely, another support secured to the lathe bed adjacent the tail end thereof, a journal box or bearing swiveled to said support, a tool spindle slidably mounted in the journal boxes and arranged to move laterally of the lathe, a longitudinal key carried by the spindle and registering with the key-way in the journal box of the support at the head of the lathe, a yoke carried by the spindle intermediate its ends, a fork carried by the carriage and engaging said yoke for moving the spindle laterally with the carriage, a taper attachment removably and adjustably secured to the carriage, and means carried by the head support coacting with said taper attachment, whereby said support may be moved transversely by the lateral movement of the carriage to move the tool spindle transversely on a horizontal line for cutting a taper.

4. In combination a lathe provided with a carriage, a block having an undercut slot therein secured to the lathe bed adjacent the head thereof, a support carrying a journal box or bearing, the latter having a key-way therein, a dove-tailed foot carried by the support and mounted in the undercut slot, whereby said slot may be moved transversely, another support secured to the lathe bed adjacent the tail end thereof, a journal box or bearing swiveled to said support, a tool spindle slidably mounted in the journal boxes and arranged to move laterally of the lathe, a longitudinal key carried by the spindle and registering with the key-way in the journal box of the support at the head of the lathe, a yoke carried by the spindle intermediate its ends, a fork carried by the carriage and engaging said yoke for moving the spindle laterally with the carriage, a taper attachment removably and adjustably secured to the carriage and adapted to move laterally therewith, said attachment having a slot therein shaped to produce the desired taper, a lever or connecting member carried by the head support, a depending pin or trunnion carried by the outer end of said lever, and a roller journaled on said pin and registering with the slot of the taper attachment, whereby the lateral movement of the carriage will move the head support transversely to position the tool spindle for cutting a taper.

In testimony whereof, I have hereunto affixed my signature.

SAMUEL HOUGH.